United States Patent
Pope et al.

(10) Patent No.: US 11,489,876 B2
(45) Date of Patent: *Nov. 1, 2022

(54) SYSTEM AND APPARATUS FOR PROVIDING NETWORK SECURITY

(71) Applicant: Xilinx, Inc., San Jose, CA (US)

(72) Inventors: Steven L. Pope, Cambridge (GB); David J. Riddoch, Huntingdon (GB); Derek Roberts, Cambridge (GB)

(73) Assignee: Xilinx, Inc., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/815,881

(22) Filed: Mar. 11, 2020

(65) Prior Publication Data

US 2020/0213364 A1    Jul. 2, 2020

Related U.S. Application Data

(63) Continuation of application No. 16/134,795, filed on Sep. 18, 2018, now Pat. No. 10,601,874, which is a continuation of application No. 15/792,481, filed on Oct. 24, 2017, now Pat. No. 10,601,873, which is a continuation of application No. 14/660,812, filed on Mar. 17, 2015, now Pat. No. 9,807,117.

(51) Int. Cl.
*H04L 9/40* (2022.01)

(52) U.S. Cl.
CPC .......... *H04L 63/20* (2013.01); *H04L 63/0227* (2013.01); *H04L 63/06* (2013.01); *H04L 63/1441* (2013.01)

(58) Field of Classification Search
CPC . H04L 63/16–168; H04L 63/20; H04L 63/06; H04L 63/14; H04L 63/1441; H04L 63/02; H04L 63/0227; H04L 63/0263
See application file for complete search history.

(56) References Cited

U.S. PATENT DOCUMENTS

| | | |
|---|---|---|
| 7,403,535 B2 | 7/2008 | Modi et al. |
| 7,404,190 B2 | 7/2008 | Krause et al. |
| 7,519,602 B2 | 4/2009 | Klemba et al. |
| 7,685,436 B2 | 3/2010 | Davis et al. |
| 7,778,194 B1 * | 8/2010 | Yung ............... H04L 47/10 709/224 |
| 7,890,692 B2 | 2/2011 | Pandya |

(Continued)

FOREIGN PATENT DOCUMENTS

EP    2843897 A1    3/2015

OTHER PUBLICATIONS

U.S. Appl. No. 14/660,812—Notice of Allowance dated Jun. 16, 2017, 42 pages.

(Continued)

*Primary Examiner* — Daniel B Potratz
*Assistant Examiner* — D'Arcy Winston Straub
(74) *Attorney, Agent, or Firm* — Haynes Beffel & Wolfeld LLP; Andrew L. Dunlap; Paul A. Durdik

(57) ABSTRACT

A rule engine receives data flows. The data flows are between a network and an application. The rule engine determines data flow information and in dependence on the information performs an action with respect to said flow. A controller provides control information to the rule engine to define one or more actions. The communications between said rule engine and said controller are secure.

15 Claims, 8 Drawing Sheets

(56) References Cited

U.S. PATENT DOCUMENTS

| | | | |
|---|---|---|---|
| 7,996,348 | B2 | 8/2011 | Pandya |
| 8,006,280 | B1 | 8/2011 | Hildebrand et al. |
| 8,423,789 | B1 | 4/2013 | Poo et al. |
| 8,473,316 | B1 | 6/2013 | Panzitta et al. |
| 9,426,124 | B2 | 8/2016 | Pope et al. |
| 2002/0099937 | A1* | 7/2002 | Tuomenoksa .......... H04L 61/00 713/153 |
| 2003/0065856 | A1 | 4/2003 | Kagan et al. |
| 2003/0117958 | A1 | 6/2003 | Nation et al. |
| 2004/0010712 | A1 | 1/2004 | Hui et al. |
| 2004/0190533 | A1 | 9/2004 | Modi et al. |
| 2004/0249998 | A1 | 12/2004 | Rajagopalan et al. |
| 2005/0010819 | A1 | 1/2005 | Williams et al. |
| 2005/0125694 | A1 | 6/2005 | Fakes et al. |
| 2005/0240593 | A1 | 10/2005 | D'Alo et al. |
| 2006/0010252 | A1 | 1/2006 | Miltonberger et al. |
| 2006/0026679 | A1 | 2/2006 | Zakas |
| 2006/0090171 | A1 | 4/2006 | Laborczfalvi et al. |
| 2006/0101273 | A1 | 5/2006 | Tan et al. |
| 2006/0117958 | A1 | 6/2006 | Sakadume et al. |
| 2006/0136570 | A1 | 6/2006 | Pandya |
| 2006/0174242 | A1 | 8/2006 | Zhu et al. |
| 2007/0188351 | A1 | 8/2007 | Brown et al. |
| 2007/0195814 | A1 | 8/2007 | Barrie et al. |
| 2007/0208854 | A1 | 9/2007 | Wiryaman et al. |
| 2007/0214504 | A1 | 9/2007 | Milani Comparetti et al. |
| 2008/0021716 | A1 | 1/2008 | Buss et al. |
| 2008/0025515 | A1 | 1/2008 | Coombs |
| 2008/0147828 | A1 | 6/2008 | Enstone et al. |
| 2008/0310440 | A1 | 12/2008 | Chen et al. |
| 2009/0106780 | A1 | 4/2009 | Nord et al. |
| 2009/0204813 | A1 | 8/2009 | Kwan |
| 2010/0037311 | A1* | 2/2010 | He .......................... H04L 63/20 709/227 |
| 2010/0125477 | A1 | 5/2010 | Mousseau et al. |
| 2011/0004771 | A1 | 1/2011 | Matsushima et al. |
| 2011/0022560 | A1 | 1/2011 | Breiter et al. |
| 2011/0060919 | A1 | 3/2011 | Smith et al. |
| 2011/0196695 | A1 | 8/2011 | Ye et al. |
| 2011/0202983 | A1 | 8/2011 | Pope et al. |
| 2012/0016833 | A1 | 1/2012 | Janiesch et al. |
| 2012/0084806 | A1 | 4/2012 | Fahrny et al. |
| 2012/0131341 | A1 | 5/2012 | Mane et al. |
| 2012/0201375 | A1 | 8/2012 | Kisielewicz |
| 2012/0210158 | A1 | 8/2012 | Akiyama et al. |
| 2012/0246520 | A1 | 9/2012 | Matsubara et al. |
| 2012/0290702 | A1 | 11/2012 | Vincent |
| 2013/0047160 | A1 | 2/2013 | Conover |
| 2013/0339947 | A1 | 12/2013 | Neary et al. |
| 2014/0053280 | A1 | 2/2014 | Durazzo et al. |
| 2014/0115578 | A1 | 4/2014 | Cooper et al. |
| 2014/0304802 | A1 | 10/2014 | Pope et al. |
| 2014/0304803 | A1 | 10/2014 | Pope et al. |
| 2015/0009796 | A1* | 1/2015 | Koponen ............ H04L 41/0695 370/216 |
| 2015/0036825 | A1 | 2/2015 | Tanizawa et al. |
| 2015/0188943 | A1 | 7/2015 | Williams et al. |
| 2015/0281178 | A1* | 10/2015 | Raman ................ G06F 9/45558 726/13 |
| 2015/0326542 | A1 | 11/2015 | Serebrin |
| 2016/0127333 | A1* | 5/2016 | Sood ........................ H04L 63/20 380/44 |
| 2016/0156591 | A1* | 6/2016 | Zhou ................... G06F 9/45533 726/13 |
| 2016/0277447 | A1 | 9/2016 | Pope et al. |
| 2016/0352687 | A1 | 12/2016 | Pope et al. |
| 2017/0244564 | A1 | 8/2017 | Naslund et al. |

OTHER PUBLICATIONS

U.S. Appl. No. 14/660,812—Corrected Notice of Allowability dated Jul. 12, 2017, 15 pages.

U.S. Appl. No. 16/121,366—Office Action dated Nov. 19, 2018, 14 pages.

U.S. Appl. No. 16/134,795—Office Action dated May 31, 2019, 49 pages.

EP 17187578.4-1870—Extended European Search Report dated Jan. 5, 2018, 11 pages.

Ruttgen, "nCipher Corporation Ltd.", Jun. 9, 2006, 28 pages, XP055435371, http://certum.eu/upload module/downloads/efpe/2006/prezentacje/3/01, (accessed Dec. 14, 2017).

Celesti et al., "A remote attestation approach for a secure virtual machine migration in federated cloud environments," In 2011 First International Symposium on Network Cloud Computing and Applications, IEEE, 2011, pp. 99-106.

Adams et al., "Internet X. 509 Public Key Infrastructure Time Stamp Protocol (TSP)", The Internet Society, 1999, 26 pages.

U.S. Appl. No. 15/792,481—Office Action dated Jun. 13, 2019, 45 pages.

U.S. Appl. No. 16/134,795—Notice of Allowance dated Nov. 14, 2019, 32 pages.

U.S. Appl. No. 16/134,795—Resposne to Office Action dated May 31, 2019 filed Oct. 30, 2019, 16 pages.

U.S. Appl. No. 15/792,481—Response to Office Action dated Jun. 13, 2019 filed Oct. 11, 2019, 15 pages.

U.S. Appl. No. 15/792,481—Notice of Allowance dated Nov. 15, 2019, 32 pages.

U.S. Appl. No. 16/121,366—Office Action dated Mar. 18, 2020, 15 pages.

U.S. Appl. No. 14/660,812—Office Action dated Jul. 5, 2016, 23 pages.

EP 16160897.1—Extended European Search Report dated Jun. 8, 2016.

U.S. Appl. No. 14/660,812—Final Office Action dated Jan. 18, 2017, 30 pages.

Chesson, "The Evolution of XTP," Proceedings of the Third International Conference on High Speed Networking, 1991, Nov. 1991, 10 pp.

Thekkath, C. A., et al., "Implementing network protocols at user level," ACM Computer Communication Review, vol. 23, No. 4, 1993, Oct. 1993, pp. 64-73.

Hrvoje, Bilic, et al.; article in Proceedings of the 9th Symposium on High Performance Interconnects, "Deferred Segmentation for Wire-Speed Transmission of Large TCP Frames over Standard GbE Networks," Aug 22, 2001, 5pp.

Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.

Shivam, P., et al., "EMP: Zero-copy OS-bypass NIC-driven Gigabit Ethernet Message Passing," Proc. 2001 ACM/EEE Conf. on Supercomputing, Denver, Nov. 10, 2001, 8 pages.

Ross, Robert, et al., "A Case Study in Application I/O on Linux Clusters," Proc. 2001 ACM/IEEE Conf. on Supercomputing, Denver, Nov. 10, 2001, 17pp.

Blanton, E. and Allman, M., "On Making TCP More Robust to Packet Reordering," ACM Computer Communication Review, vol. 32, No. 1, 2002, Jan. 2002, pp. 20-30.

Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.

Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.

Smith, Jonathan, ACM Computer Communication Review, vol. 32, No. 5, pp. 29-37, 2002, Nov. 2002.

Adiga, Nr, et al., "An Overview of the BlueGene/L Supercomputer," Proceedings of the 2002 ACM/IEEE conference an Supercomputing, Baltimore, Nov. 16, 2002, pp. 1-22.

Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.

(56) References Cited

OTHER PUBLICATIONS

Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
McAuley, Derek and Neugebauer, Rolf, "A case for virtual channel processors," NICELI '03 Proc.of the ACM SIGCOMM workshop, Aug. 2003, pp. 237-242.
Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).
Currid, Andy, "TCP Offload to the Rescue," ACM Queue, vol. 2, No. 3, 2004, May 1, 2004, pp. 58-65.
Lazowska, Edward D. and Patterson, David A., "Computing Research: A Looming Crisis," ACM Computer Communication Review, vol. 35, No. 2, 2005, Jul. 2005, pp. 65-68.
Leslie, B., et al., "User-level Device Drivers: Achieved Performance," J. Comput. Sci. & Technol., vol. 20, Sep. 2005, Sep. 2005, 17pp.
Balaji, P., et al., "Head-to TOE Evaluation of High-Performance Sockets over Protocol Offload Entines," Proceedings of the IEEE International Conference on Cluster Computing, 2005, Sep. 2005, 10pp.
Bhandarkar, Sumitha, et al., "LTCP: Improving the Pemnormance of TCP in Highspeed Networks," ACM Computer Communication Review, vol. 36, No. 1, 2006, Jan. 2006, pp. 41-50.
Dickman, "Protocol Offloading vs OnLoading in High Performance Networks," 14th Symposium on High Performance Interconnects, Aug. 23, 2006, 8pp.
EP 14163938.5—Extended European Search Report dated Feb. 3, 2015, 8 pages.
U.S. Appl. No. 14/165,371—Office Action dated Feb. 27, 2015, 58 pages.
U.S. Appl. No. 14/248,082—Office Action dated Mar. 25, 2015, 51 pages.
U.S. Appl. No. 14/165,371—Final Office Action dated Sep. 11, 2015, 24 pages.
U.S. Appl. No. 14/248,082—Final Office Action dated Oct. 8, 2015, 18 pages.
U.S. Appl. No. 14/248,082—Response to Office Action dated Mar. 25, 2015 filed Jun. 25, 2015, 15 pages.
U.S. Appl. No. 14/248,082—Notice of Allowance dated Apr. 25, 2016, 50 pages.
U.S. Appl. No. 14/165,371—Office Action dated Apr. 5, 2016, 23 pages.
U.S. Appl. No. 15/231,564—Office Action dated Oct. 21, 2016, 16 pages.
U.S. Appl. No. 14/165,371—Response to Feb. 27 Office Action filed Jun. 15, 2015, 20 pages.
U.S. Appl. No. 14/165,371—Response to Final Office Action dated Sep. 11, 2015 filed Dec. 12, 2015, 16 pages.
U.S. Appl. No. 14/165,371—Response Office Action dated Apr. 5, 2016 filed Jul. 25, 2016, 19 pages.
U.S. Appl. No. 14/165,371—Final Office Action dated Nov. 2, 2016, 25 pages.
U.S. Appl. No. 14/248,082—Response to Final Office Action dated Oct. 8, 2015 filed Feb. 11, 2016, 8 pages.
U.S. Appl. No. 14/165,371—Adviosry Action dated Jan. 5, 2016, 3 pages.
U.S. Appl. No. 14/248,082—Final Office Action dated Dec. 11, 2015, 56 pages.
U.S. Appl. No. 14/248,082—Response to Final Office Action dated Dec. 11, 2015 filed Mar. 10, 2016, 9 pages.
U.S. Appl. No. 14/248,082—Advisory Action dated Mar. 8, 2016, 8 pages.
U.S. Appl. No. 15/231,564—Response to Office Action dated Oct. 21, 2016 filed Feb. 21, 2017, 19 pages.
U.S. Appl. No. 15/231,564—Preliminary Amendment dated Aug. 16, 2016, 6 pages.
U.S. Appl. No. 14/165,371—Final Office Action dated Nov. 2, 2016 filed Mar. 3, 2017, 16 pages.
U.S. Appl. No. 14/660,812—Response to Office Action dated Jul. 5, 2016, filed Dec. 29, 2016, 16 pages.
U.S. Appl. No. 15/231,564—Final Office Action dated May 3, 2017, 22 pages.
EP 14163938.5—Office Action dated Jan. 30, 2017, 5 pages.
U.S. Appl. No. 14/660,812—Response to Final Office Action dated Jan. 18, 2017, filed May 18, 2017, 16 pages.
Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.
Shivam, P., et al., "EMP: Zero-copy OS-bypass NIC-driven Gigabit Ethernet Message Passing," Proc. 2001 ACM/IEEE Conf. on Supercomputing, Denver, Nov. 10, 2001, 8 pages.
Adiga, Nr, et al., "An Overview of the BlueGene/L Supercomputer," Proceedings of the 2002 ACM/IEEE conference on Supercomputing, Baltimore, Nov. 16, 2002, pp. 1-22.
Bhandarkar, Sumitha, et al., "LTCP: Improving the Permormance of TCP in Highspeed Networks," ACM Computer Communication Review, vol. 36, No. 1, 2006, Jan. 2006, pp. 41-50.

\* cited by examiner

SYSTEM AND APPARATUS FOR PROVIDING NETWORK SECURITY

CROSS-REFERENCE TO OTHER APPLICATIONS

This application is a continuation of U.S. patent application Ser. No. 16/134,795, filed 18 Sep. 2018, entitled SYSTEM AND APPARATUS FOR PROVIDING NETWORK SECURITY, which is a continuation of U.S. patent application Ser. No. 15/792,481, filed 24 Oct. 2017, entitled SYSTEM AND APPARATUS FOR PROVIDING NETWORK SECURITY, which is a continuation of U.S. patent application Ser. No. 14/660,812, filed 17 Mar. 2015, entitled SYSTEM AND APPARATUS FOR PROVIDING NETWORK SECURITY, now U.S. Pat. No. 9,807,117, issued 31 Oct. 2017, all of which are incorporated herein by reference in their entirety.

BACKGROUND OF THE INVENTION

Some embodiments of the invention relate to a system and apparatus for providing security within a network environment.

SUMMARY

In some embodiments, there is provided a system comprising: a rule engine configured to receive data flows, said data flows being between a network and an application, said rule engine being provided between said network and said application, said rule engine being configured to determine data flow information and in dependence on said information to perform an action with respect to said flow; and a controller, said controller configured to provide control information to said rule engine to define one or more actions, wherein communications between said rule engine and said controller are secure.

The controller may be configured to receive information from said rule engine about said data flows.

The rule engine may have a first data store configured to store at least one first key.

The controller may have a second data store configured to store at least one second key.

At least one of said first and second data stores may comprise a one time programmable memory.

At least one of said first and second data stores may comprise a hardware security module.

At least one of said first and second keys may be stored in said data store at manufacture.

At least one of said rules engine and said controller may be configured to receive a message from a trusted authority and to verify said message using a respective key of said at least one first key and said at least one second key.

The message received by the controller may comprise a public key associated with said at least one first key of the rules engine and the message received by the rule engine may comprise at least one public key associated with the at least one second key of the controller.

One of said rules engine and said controller may be configured to send a message to the other of said rules engine and said controller, said message encrypted by a public key and signed with a private key of said one of said rules engine and said controller, said message comprising a further key to use for said secure communications between the rules engine and the controller.

The rule engine may be provided in a first trusted domain and said controller may be provided in a second trusted domain, different to the first domain The controller may be provided in a trusted virtual machine.

The rules engine may be provided in a network interface device.

The rules engine may be provided in a hypervisor.

A plurality of rules engines may be provided.

The data flow information may comprise header information.

The controller may be configured to provide a look up function for at least one data flow for said rules engine.

The controller may be configured to provide a look up function if said data flow information associated with a respective dataflow is not present in said rules engine.

The rules engine may be is configured to perform a look up operation in dependence on said data flow information, said look operation providing one or more of state associated with the data flow, at least one rule, delivery information and a count.

The rules engine may comprise an execution block configured to perform said at least one action defined by said rule and update information in a data store of said rules engine.

The rules engine may be provided in hardware, in software or in hardware and software.

The controller may be provided in hardware, in software or in hardware and software.

According to an embodiment, there is provided an apparatus comprising: a rule engine configured to receive data flows, said data flows being between a network and an application, said rule engine being provided between said network and said application, said rule engine being configured to determine data flow information and in dependence on said information to perform an action with respect to said flow, said rule engine configured to receive control information from a controller defining one or more of said actions, wherein communications between said rule engine and said controller are secure.

According to an embodiment, there is provided an apparatus comprising: a controller, said controller configured to provide control information to a rule engine to define one or more actions, the rule engine configured receive data flows between a network and an application and to perform an action with respect to said flow, wherein communications between said rule engine and said controller are secure.

According to an embodiment, there is provided an apparatus comprising: a rule engine configured to receive data flows, said data flows being between a network and an application, said rule engine being provided between said network and said application, said rule engine being configured to determine data flow information and in dependence on said information to perform an action with respect to said flow, said rule engine configured to receive control information from a controller defining one or more of said actions, wherein communications between said rule engine and said controller are secure.

According to an embodiment, there is provided a computer program product, the computer program product being embodied on a non-transient computer-readable medium and configured so as when executed on a processor to provide a rule engine which: receives data flows, said data flows being between a network and an application; determines data flow information and in dependence on said information to perform an action with respect to said flow; and receives control information from a controller defining one or more of said actions, wherein communications between said rule engine and said controller are secure.

According to an embodiment, there is provided a computer program product, the computer program product being embodied on a non-transient computer-readable medium and configured so as when executed on a processor to provide a controller which: provides control information to a rule engine to define one or more actions, the rule engine configured receive data flows between a network and an application and to perform an action with respect to said flow, wherein communications between said rule engine and said controller are secure.

BRIEF DESCRIPTION OF DRAWINGS

Some embodiments will now be described by way of example only with reference to the accompanying Figures in which.

DETAILED DESCRIPTION OF EMBODIMENTS

Figure 1:
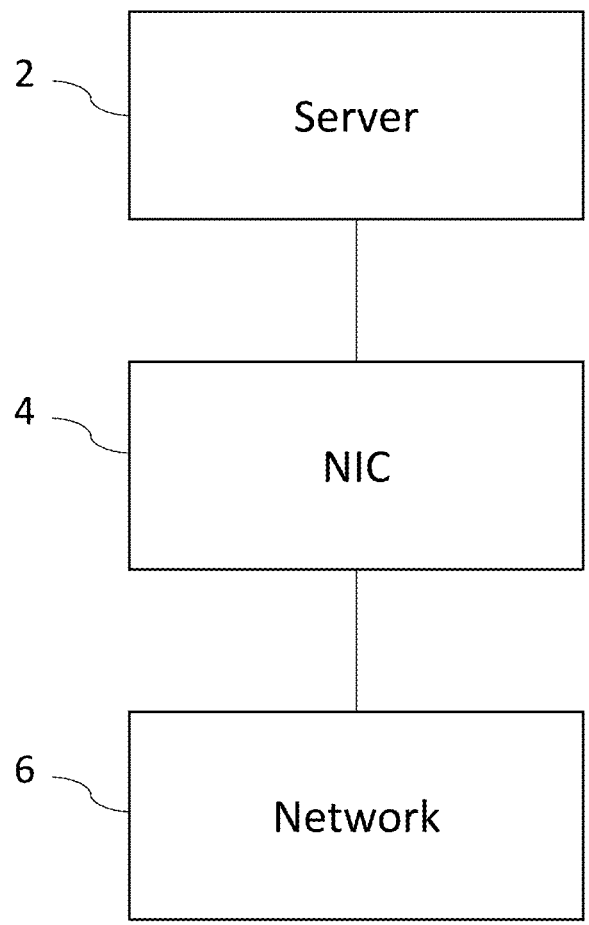
FIG. 1 shows a schematic overview of a network architecture in which some embodiments may be provided.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Some embodiments may provide a distributed server edge network security product.

Corporate data centers may need to be protected, for example from a number of attacks and breaches which at present may exploiting internal communications and which may not be caught by traditional firewall and intrusion detection techniques. For example employees may access and export data from within an organization either maliciously or inadvertently, subverting existing security provisions. Breached equipment which having been compromised may then be used to stage further penetration within an organization Another form of attack is where a network is used to bombard servers with attack patterns or traffic designed to degrade performance. This is sometimes referred to as distributed denial of service. (DDoS)

Some companies allow the bringing in of people's own devices. This may increase exposure of the internal network to potential attacks. Increasingly such devices are communicating using encrypted protocols such as SSL (secure sockets layer) which unless decrypted by a firewall device represent a further potential breach of security.

All of the above are further exacerbated by the increase of data-center east-west traffic and leaf-spine network architectures. East-west traffic is the traffic that goes between servers in a given data center or the like. The leaf-spine architecture is also known as a distributed core. This architecture has spine switches and leaf switches. The spine comprises high-throughput layer 3 switches. The leaf switches are the access layer and provide network connection points for servers. Each leaf switch will generally connects to every spine switch.

The growing desire to use cloud-like provisioning and deployment of software-defined networks makes the situation more complex since the physical locality of services becomes lost. Enumerating L4 (IP-flow) like rules for a complex enterprise network can be a daunting task and managing the resulting huge rule sets may be difficult. Further, many services themselves depend on edge devices possessing sensitive cryptographic key information which key information should be protected.

Generally, the further away a policy is defined from a destination host the more permissive it usually is due to the complexity of systems, networks, and services that exists below the implementation point.

In some embodiments server/service specific policy may be applied at the distributed edge. This may provide for enhanced service delivery and/or a more resilient infrastructure when under attack.

There are a number of ways by which a network interface function may improve these security issues in some embodiments.

Reference is made to FIG. 1 which schematically shows an arrangement where a data processor 2 such as a server is configured to communicate with a network 6 via a network interface device 4, sometimes referred to a NIC. A network interface device could be provided in any suitable form, including as a peripheral device or integrated with the hardware of a host data processing device. A data processor could be any kind of computer system, including a server, personal computer, or a bespoke processing unit. A network interface device as described herein provides an interface to a network for use by its host data processing device. In this document, reference is made to a security providing NIC. It should be appreciated that this security providing NIC may be any suitable network interfacing device.

The security providing NIC while logically a component of a server may can be considered to be a physically separate and distinct piece of hardware and logically distinct network entity.

In some embodiments, the NIC may be implemented by a hardware device. In other embodiments, the NIC may be implemented by a hardware device along with software in an operating system for example.

The NIC in some embodiments, does not execute application code. The NIC may only be accessed through highly crypto-secure interfaces. The NIC may be constructed to be tamper resistant. The NIC may be regarded as secure gatekeeper between the server and the network, protecting both the network from malicious or faulty servers and the server from the network. The network may be an untrusted and/or compromised network. The server may be an untrusted and/or compromised server.

The NIC may be a party to every network flow through the server. The NIC is able to monitor which application is communicating and to where. The NIC may be able to prevent flows being established between unauthorized networks and/or domains. By monitoring the actual flows which are happening in real time each NIC can report and so collaboratively may generate an entire connectivity graph for a data center for analysis.

The NIC may be able to detect many of the common attacks based on protocol within frame headers or the traffic's temporal behavior. For example, a very small TCP window size or a very high connection rate may be indicative of anomalous behavior. For such packets, the NIC can enforce by immediately dropping or querying another entity, or monitor by reporting and generating alerts.

The NIC may provide a control point. In some embodiments, by establishing an overlay network which enables distributed control of the NIC functions, a layer of network management can be provided which may be cryptographically secure and/or where control can be restricted to a small set of authorized operators.

This layer may act which can be used to protect against bad-actor employees who may otherwise have administrative access to servers and switches. In some embodiments, this layer may be retro-fitted to a company's or the like internal network.

In some embodiments, the NIC may provide one or more of the following:
- monitoring and/or securing of every network packet;
- provide a protected and/or tamper resistant execution domain;
- isolate and/or identify compromised servers;
- protect servers and/or data from network attack; and
- protect organizations from malicious operators.

Some embodiments may provide a distributed server edge network security product which provide the secure NIC function which may be implemented using hardware and/or software components and which is securely managed over the data center or network.

Logically the secure NIC or security system comprises a rule engine and a controller. It is possible that the two are physically co-located for example both on a host or both on a physical NIC. If they are separated then communication between the rule engine and the controller may take place via a channel which is cryptographically or otherwise secure. For example the rule engine may be on the physical MC and the controller may be implemented on a server. Various different embodiments will now be described.

In some embodiments, the rule engine may be provided in one trusted domain and the controller may be provided in a different trusted domain. The communication between the rule engine and controller is secure, using for example encryption.

Figure 2:
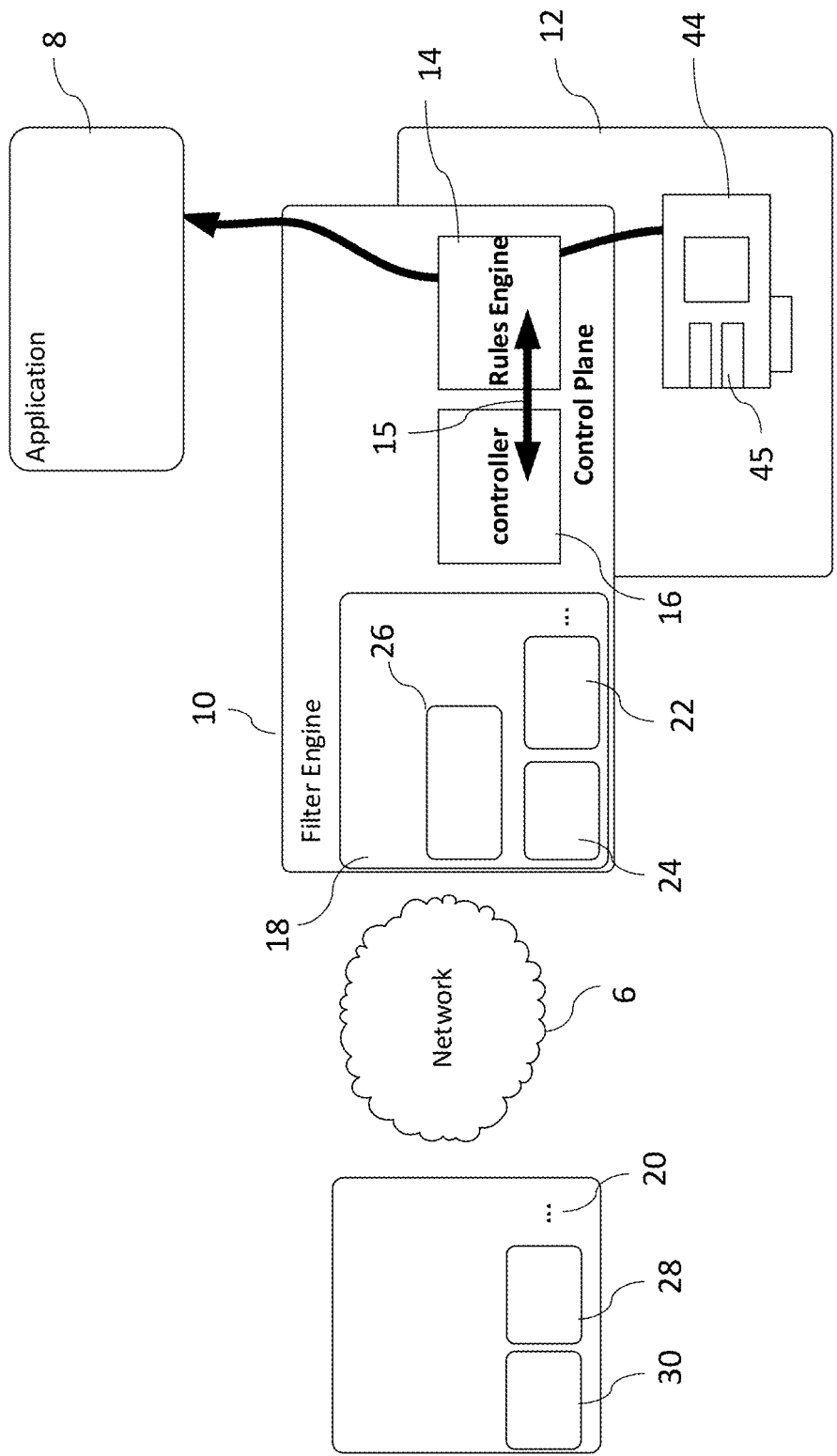
FIG. 2 shows a first example of an architecture with a distributed server edge network security product.

Reference is made to FIG. 2 which shows a first architecture having distributed server edge network security. The arrangement of FIG. 2 has filter engine software with a controller 16 and a rules engine 14. A control plane 15 is provided there between. The filter engine software may be provided by a server and may be provided in the operating system and/or user space. The controller 16 and rules engine 14 may provide a distributed server edge network security.

In the arrangement shown in FIG. 2, an application 8 is provided. The application 8 may be provided by a server and is typically provided in the user space. The filter engine 10 is implemented in software and provides the controller 16 and the rules engine 14. The NIC 12 has NIC related hardware components 44.

The communication between the NIC hardware and the application 8 may be controlled and/or monitored by a rules engine 14. The function provided by the rules engine 14 is controlled by a controller 16. The control plane 15 provided between the controller 16 and the rules engine 14 allows the controller to provide control information to the rules engine and/or for the rules engine to provide information to the controller. As part of the filter engine, a management component 18 may be provided. This may comprise one or more connector functions 22, 24, 26 which may manage the NIC. A function may provide a standalone management application (for example with GUI (graphical user interface and/or a CLI (command line interface) for a virtual appliance). Alternatively or additionally the function may interface directly with IT orchestration systems such as Puppet, third party threat information sources such as the Norse Dark List, and/or as an object exposed through CIM (common information module).

Communication between the management component 18 of the filter engine and a corresponding management function 20 is provided via a network 6. The functions may be provided on different servers of an internal network. The corresponding management function may provide a respective client 28 or 30 for a function provided by the management component 18. For example if the management component 18 comprises a Puppet connector, the respective management function comprises a Puppet client. If a CIM provider 24 is provided in the management component, a respective CIM client is provided in the corresponding management function. It should be appreciated that in some embodiments, not all of the functions provided in the management component 18 will have a corresponding function in the corresponding management function 20.

The rules engine may record all flow associated to and/or from the application. The rules engine may report to the controller via the control plane. The rules engine may have one or more rules which have an enforcement function. Some examples of the rules and the interaction with the controller will be described in more detail later.

The securing of the control plane may be achieved in any suitable manner. For example the securing of the network could be achieved for example by using strong hash authenticated messages over a network. Some examples of the securing of the control plane will be described later.

Figure 3:
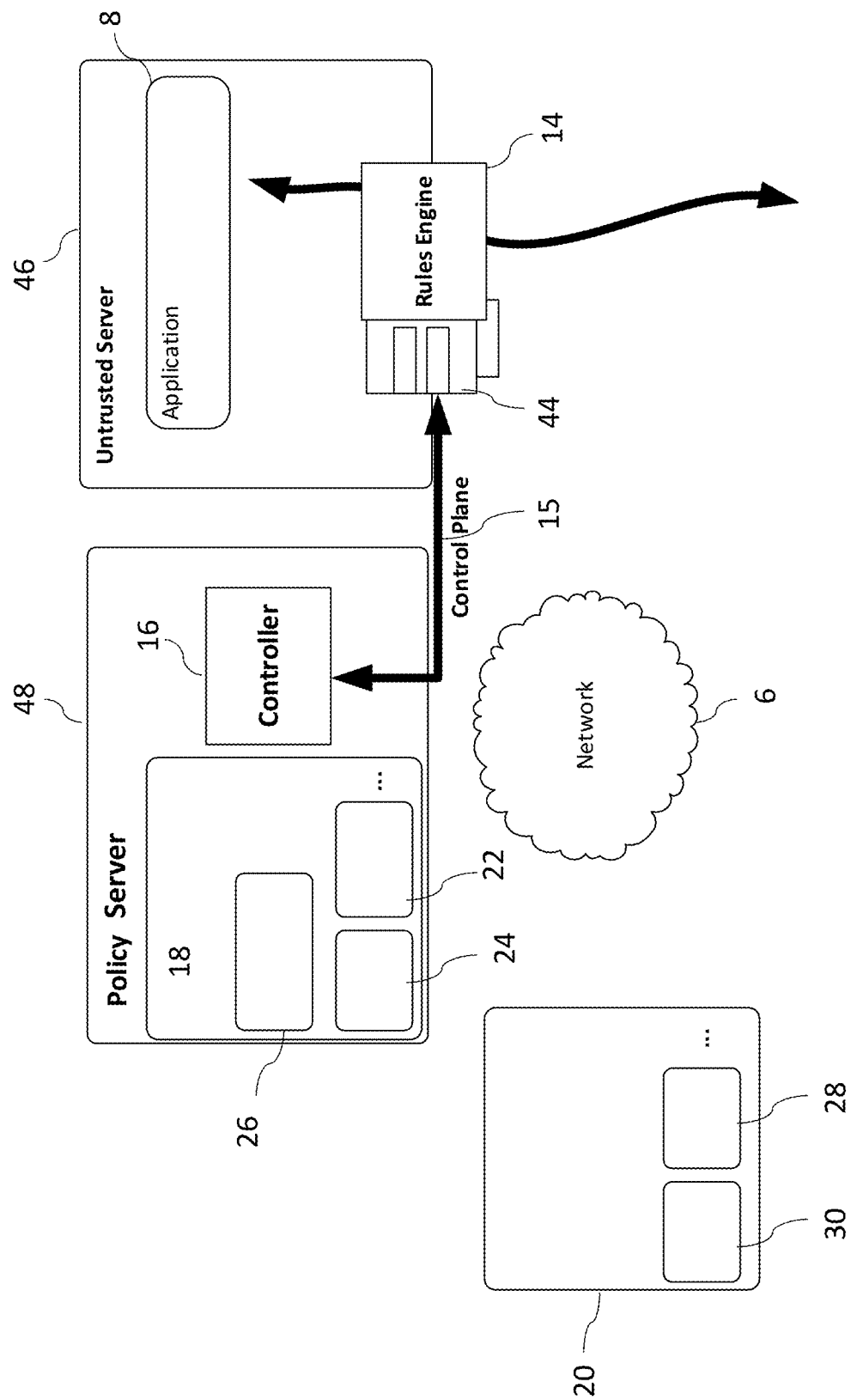
FIG. 3 shows a second example of an architecture with a distributed server edge network security product.

Reference is made to FIG. 3 which shows a second architecture having a distributed server edge network security. Those parts which generally correspond to those in FIG. 2 have the same reference. In FIG. 3, the controller 16 and management component 18 are instantiated within a standalone appliance 48. This is referred to a policy server in this document. This may be a first trusted domain.

The rules engine 14 is implemented by the hardware 44 within the physical NIC and may be separated from the appliance by a network. The NIC may be a second trusted domain. The control plane traffic may be carried over the same network as the traffic to which the NIC is applying rules, or via an alternative network or network partition. The application 8 may be provided by a server 46, different to the sever 48 providing the controller.

The rule engine and controller both may be constructed so as to be tamper resistant. When the rule engine is implemented on a physical NIC, the physical design should resist probe and glitch attacks. Any key stored in non-volatile memory 45 of the NIC may be inaccessible, for example through the use of on-die one time programmable memory or nonvolatile micro fuses. Protocols used to establish a secure channel should be resistant to man in the middle and other attacks where the physical interface could be entirely replaced. When implemented in software the controller should execute in a trusted execution domain, for example a virtual appliance running within an operating system configured with high security.

While the source code of the controller may be restricted, it should not be the case that any knowledge of this code would assist an attack. In some embodiments, the only interfaces supported by the controller are the secure channels to the rule engines and a hardened API (application programming interface). This API may be designed to minimize the attack surface of the controller and may protect the integrity of the controller against malicious clients. This API provides an interface to the management component in some embodiments.

The API may use one or more of the following techniques:
strongly typing of parameters including storage requirements;
separated address spaces with parameter copy and verification;
digitally signed and authenticated API invocations (using physical authentication tokens); and
minimization of entry points and their semantics.

Figure 4:
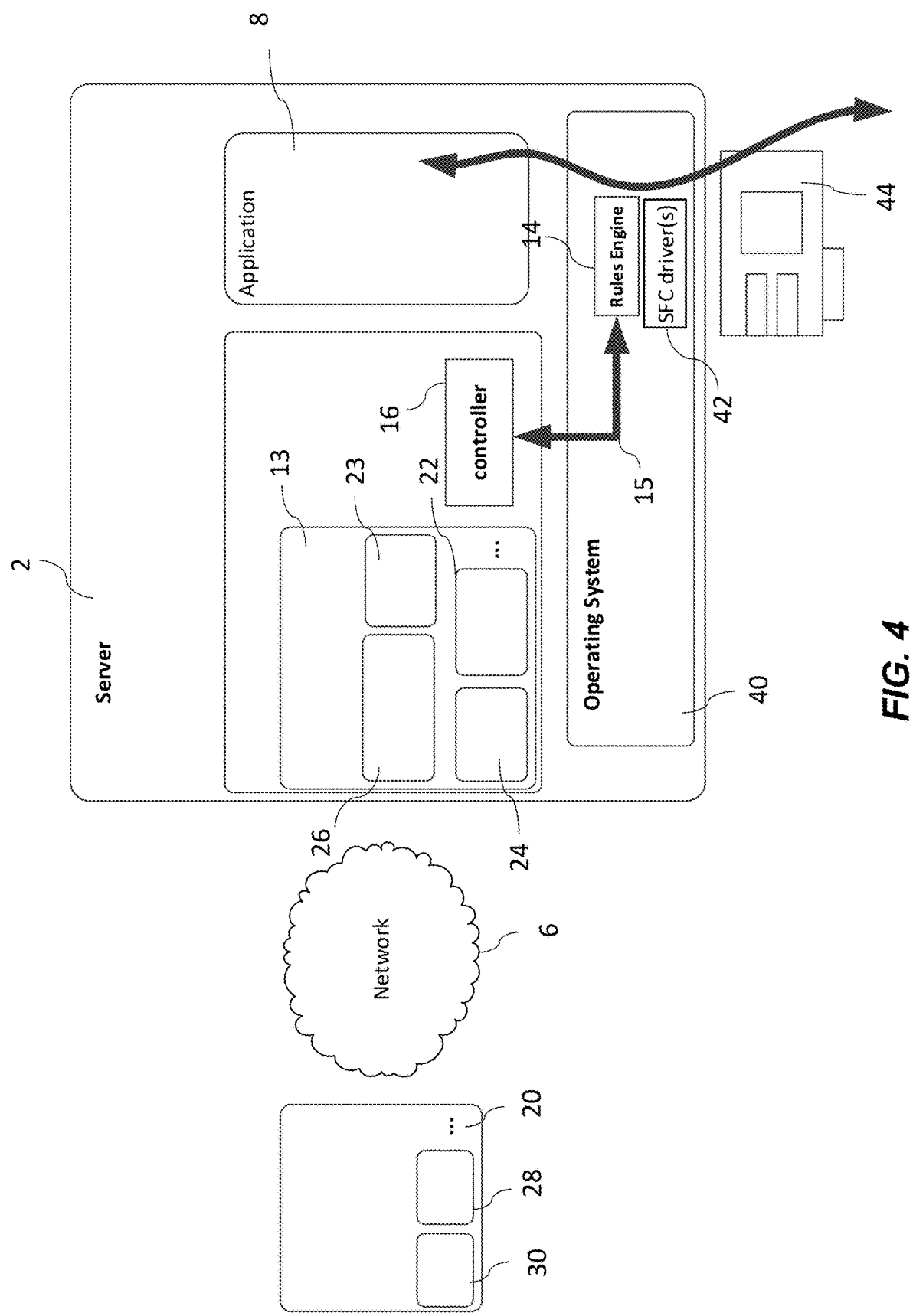
FIG. 4 shows a third example of an architecture with a distributed server edge network security product.

Reference is made to FIG. 4 which shows a third architecture having a distributed server edge network security. Those parts which generally correspond to those in FIG. 2 or 3 have the same reference. A server 2 provides the application 8 which is protected by the filter engine 10. The filter engine 10 has the controller 16 and the management component. The filter engine may be provided in the operating system and/or user space. The controller at least is in a trusted domain.

The rules engine 14 may be provided in the operating system 14 along with a driver 42 for the NIC. The controller may thus be integrated with software which is used to manage the secure NIC. This may be any one or more of the functions of the management component.

Figure 5:
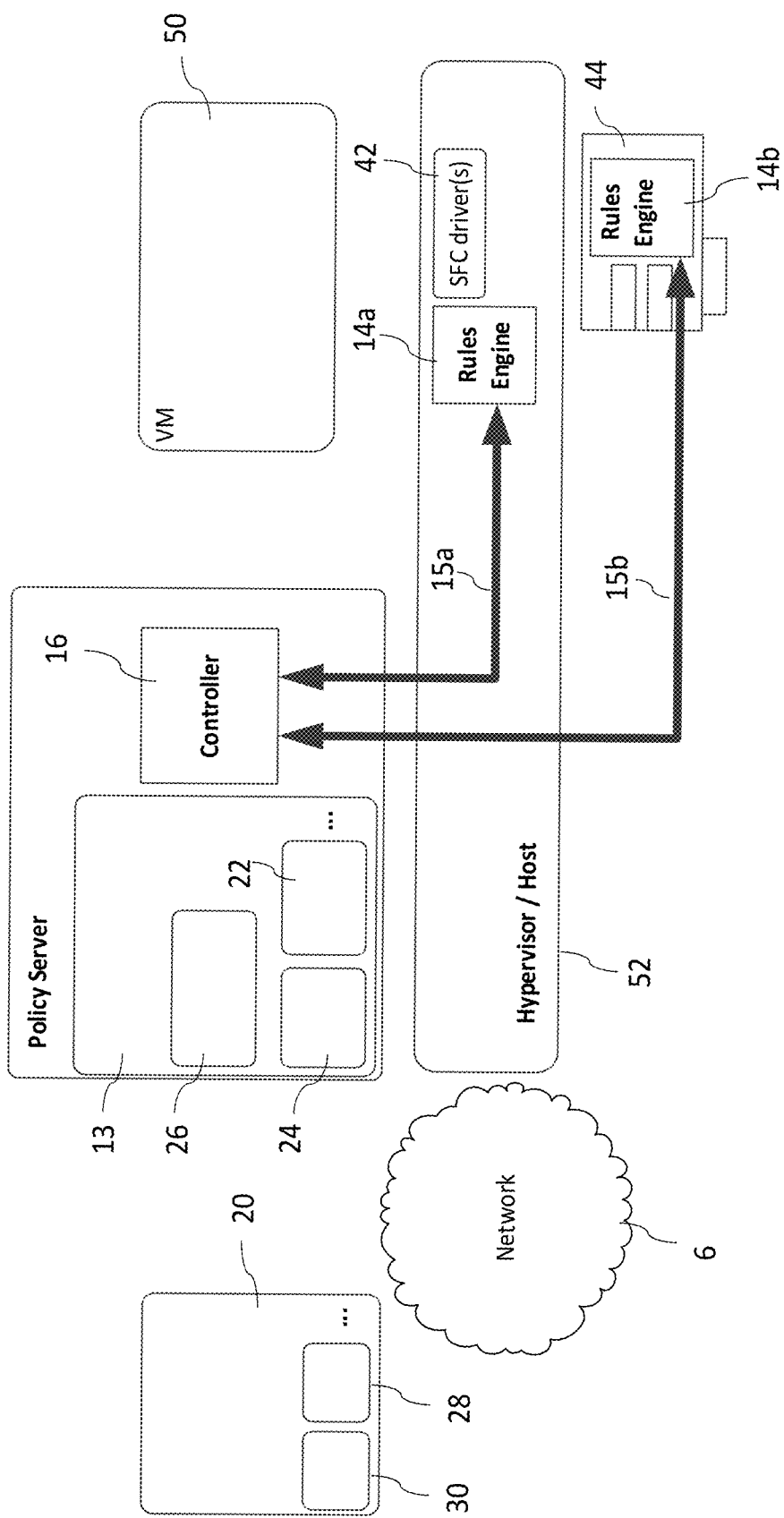
FIG. 5 shows a fourth example of an architecture with a distributed server edge network security product.

Reference is made to FIG. 5 which shows another architecture having a distributed server edge network security. Those parts which generally correspond to those in FIG. 2, 3 or 4 have the same reference. As with the arrangement of the FIG. 3, the filter engine 18 and controller 16 are provided by, for example a policy server 48.

The policy server 58 may be provided in a trusted VM (virtual machine) controlling both hardware and software rules engines. A VM 50 is an untrusted VM and may support an application (not shown). In this embodiment, the secure appliance or policy server 58 is implemented as a virtual machine. In some embodiments, the secure appliance may be running on the same physical server as the guests which are being protected. The filter engine and controller are thus running in a trusted VM in some embodiments.

The untrusted VM is protected by the software and hardware rule engines.

In some embodiments, such as shown in FIG. 5, the distributed server edge network security may have a plurality of rules engines 14a and 14b which are implemented in hardware and software. The rules engines may be used in combination for example to partition the checking. This may require the flows to be balanced across two or more rules engines. Alternatively or additionally, the rules engines may be used to layer additional features or properties. For example a software rules engine may have access to large amounts of memory and so can scale to large numbers of rules whereas a rules engine on a NIC may be more constrained.

In the example of FIG. 5, a rules engine 14a and driver 42 is in provided in a Hypervisor or host and a rules engine 14b is provided in the NIC 44.

This architecture can used for any suitable hypervisor/container based environments.

In some embodiments, the degree of trust for all entities needs to be understood/determined and communicated. Generally it is desirable that any higher order controller or management software should be aware of the level of trust and be able to cope with an environment potentially comprising compromised elements, for example rules engines which are considered to be bad actors.

In some embodiments, driver filter insertion requests are proxied over a Control Plane to an authoritative trusted daemon.

Figure 6:
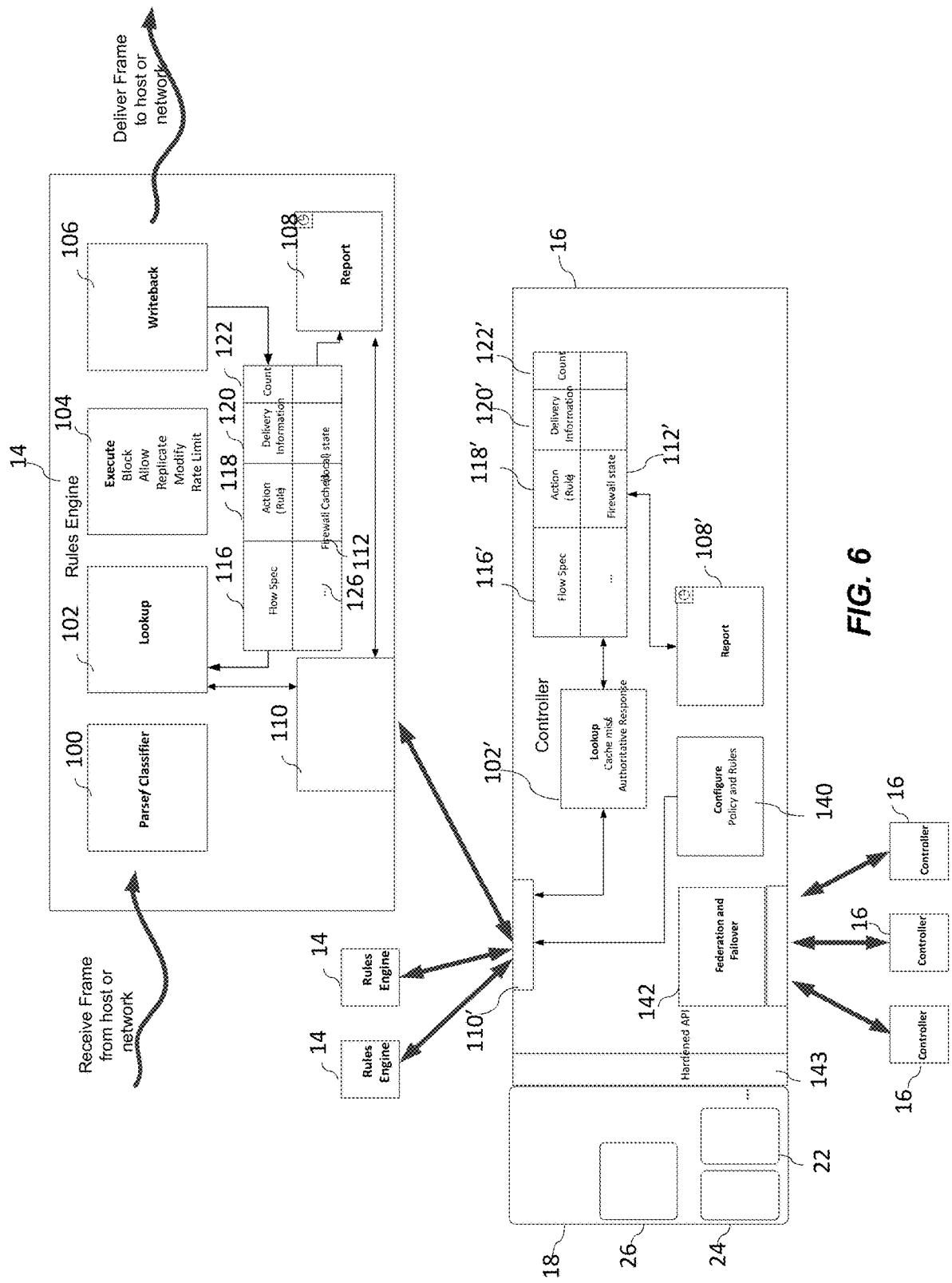
FIG. 6 shows a functional view of a rules engine and a controller.

The operation of the rules engine and controller and the logical separation of functions are illustrated in FIG. 6.

The rules engine 14 may be required to process network frames at high-speed. A parser 100 is configured to parse and classify a receive frame. The parser may parse through network headers for example any one or more of Layer 2, 3 and 4 headers and application headers such as http. A given classification triggers a number of lookup operations by a look up function 102. The lookup operations may be expressed through a programmable micro-engine 112. These operations may comprise one or more of perfect matching or longest prefix matching of headers through to regular expression matching over the entire frame and, inline decryption. The capabilities of the rule engine may effect the amount of state available for lookup.

For some embodiments, where there is insufficient storage available locally at the rules engine (for example an ASIC implementation), the look up function should treat the local state as a cache and request a fill, or authoritative answer from the controller. During the time taken to respond to such a request, the NIC may be required to drop packets or backpressure the network.

The lookup operation to data store 112 will typically return some state associated with the identified network flow 116, an action or rule 118, delivery information 120 and a counter 122. One example action would be to monitor, where it is only required for the rule engine to increment the counter for this particular network flow. Other actions may be a drop action for black-listing operation or an allow action for white-listing. The rule engine may be required to replicate frames for audit purposes, or modify frames so as to enable a timestamp to be inserted, or rate-limit flows. These actions are by way of example and any other suitable actions may alternatively or additionally be performed. A plurality of actions may be performed for a given work flow.

The execution block 104 of the rule engine performs the required action and the write-back block 106 returns required changes to the firewall state 126 in the data store. Thus in some embodiments, state information associated with the data flows is stored. This may comprise incrementing the flow counter or inserting a new flow if the rules engine has been configured to self-learn rather than to be populated with rules provided by the controller. Some rule engines may provide a combination or self-learning and use rules provided by the controller.

The rules engine has control plane function 110 which is configured to encrypt messages sent to the controller via the control plane and decrypt messages received from the controller via the control plane. This is discussed in more detail later.

The state may contain delivery information, for example to allow particular flows to be directed to different receive interfaces.

The rules engine may periodically provide its state relating to the data flows to its controller and/or the controller may request state from the rules engine. This provided by the reporting function 108 of the rules engine. This in turn allows reports to be provided by the reporting function 108' of the controller, for example, the network-flows which are actually established over a given time period can be useful information. Where the rules engine is required to provide a logging action, such events can be delivered through the reporting mechanism.

The rule engine may provide one or more of the following functions:

Parse all incoming and outgoing frames, for example through L4;

Match all frames according to the filter types using the NIC resident lookup table and a number of operational modes;

Match frames according to a user specified bitmask and frame offset relative to a set of classified header boundaries;

If no match is made, a monitor mode may insert a matching filter and initial count into the filter table. The frame may be delivered according to a default delivery configuration;

If no match is made, a blacklist mode may deliver the frame according to the default delivery configuration;

If no match is made, a whitelist mode may drop the frame and generate an alert;

If no match is made, a proxy mode may query an associated controller element for an action and process the frame as though this information were matched in the NIC resident lookup table-in this mode during the query the data flow can be blocked or dropped;

If a match is found, the lookup table may present an action (rule), delivery information and a counter. The rule engine may do one or more of deliver, drop, replicate, and rate-limit and insert a timestamp to/into the frame according to the action and delivery information. The rule engine may update the lookup table according to the action, delivery information and counter.

If filter table is full when inserting a new flow, the rules engine may age out old flows based on LRU (least recently used) or some other appropriate heuristic This may involve the old flow state including statistics being sent to the controller which could later refresh if the flow becomes active again;

Generate logging and alerts;

Maintain counters for statistics on actions;

Periodically and/or in response to queries from the controller, the rules engine may send one or more of the contents of the filter table, logging and alerts to the controller; and The rules engine may receive the filter table and configuration information from the controller and may not require any support from software or drivers running on a local server.

The rules engine may be implemented in FPGA, by an ASIC or any other suitable entity.

A hardened API 143, such as described earlier, is provided between the filter engine and the controller. The controller has a look up function for cache misses or for an authoritative response. The look up may be to a data store 112'. The data store 112' may replicate the information in the rules engine, for an network flow 116', for example an action (rule) 118', delivery information 120' and a count 122' as well as firewall state 112'.

The controller is able to provide an authoritative response if the rules engine is not. In that scenario, the rules engines acts as a cache.

The controller has function 140 for configuring policy and rules.

The controller has control plane function 110' which is configured to encrypt messages sent to the rules engine via the control plane and decrypt messages received from the rules engine via the control plane. This is discussed in more detail later.

The controller may as schematically shown communicate with a plurality of rules engines 14. The rules engine (or each or the rules engines) will have a secure control plane with the controller.

In some embodiments, there may be a plurality of controllers. This may be to deal with failure of a controller and/or for effective management of a network. Secure communication such as between the rules engines and the controller may be provided between the controllers.

In some embodiments, each rule engine will use a different key to communicate with the same controller. In some embodiments, a controller may communicate with different controllers using different keys. The controllers may communicate to share state so that failover is possible from one controller to another.

The controller may be implemented in a secure manner with a runtime which is resistance to attack.

The controller may execute in a hardened (relatively secure) OS environment.

The controller may control a large number of rules engine instances. By way of example only, some controllers may control the order of a 1000 rules engines.

In the event of a problem, the controller may be able to failover to another controller and to restart. In some embodiments, the plurality of controllers may not maintain state consistency across the controller.

The controller may have an API to receive configuration information and rules from management connectors or local administration. This may be from the connection management function.

The controller may log and store API operations for audit purposes. For example time, date, and identity may be stored. Identity may be a user identity, a flow identity and/or a functional block or entity identity.

The controller may receive or enforce API operations which are digitally signed or otherwise authenticated. The controller may therefore be set up with authentication credentials of for example the management connection function or administrative function.

The controller may be arranged to disseminate configuration information and rules to the rules engines.

The controller may be arranged to periodically query the rules engines for state updates.

The controller may be arranged to monitor and report the health and activity state of all rules engines including logging and alerts.

The controller may be arranged to respond to requests for authoritative rule lookups from rules engines.

The controller may be arranged to receive events, logging, statistics and flow table information from the rules engines and report this information over the API to management connection function.

In some embodiments, the controller may in addition to implementing a secure NIC functionality implement remote management operations over a set of NICs. The set may comprise a plurality of NICs.

In some embodiments, the controller may allow persistent NIC configuration settings to be set and reported. In some embodiments, the controller may allow NIC partitioning configuration to be set and reported.

In some embodiments, the controller may allow QoS (quality of service) configuration to be set and reported.

The controller may support the gathering and remote monitoring of NIC operational statistics.

The control plane between the controller and the rule engine is encrypted using encryption keys. Any suitable mechanism for the distribution of keys may be used. In some embodiments, it may be possible to configure one or more or all NICs in a deployment to be controlled only by their controller instances.

For example serial numbers for NICs are harvested and a file produced which is used to lookup the appropriate keys for the controller and NIC instances. Some embodiments may use asymmetric (or public-key) based exchanges in order to establish these communication channels of the control plane.

In order to avoid, for example, an attack where bad public keys are reported to controllers, the authority determines public keys from a known list indexed on serial numbers. The distributed lists are themselves digitally signed by the authority which could be any suitable entity. The NICs and the controllers are programmed securely with the key required to verify this digital signature.

In some embodiments, the rules engine may be programmed at manufacture or at a trusted customer location to securely store cryptographic key information. In some embodiments, at least some of the stored cryptographic key information may be unique to the particular rules engine.

A hardware based rules engine may be designed to not release this information nor to allow it to be subsequently modified. A software based rules engine may use a HSM (Hardware Security Module) at the controller to store these keys in a secure manner.

In some embodiments, the NIC may be used as a secure place to store the keys and effectively act as an HSM. The NIC may store the keys for the rules engine (regardless of whether or not the rules engine is on the NIC) and/or for the controller.

In some embodiments, sensitive material may be stored in the ASIC for the benefit of applications. For example to allow server data to be stored only in an encrypted format and used decrypted by the NIC. This may provide an integration of HSM and NIC functionality.

Each controller may be programmed at manufacture or at a trusted location to securely store cryptographic key information. At least some of the stored information may be unique to the particular Controller. Integrity of the controller may require the use of a HSM to store these keys in a secure manner.

The rules engines and controllers may both receive messages from an authority and verify their authenticity using some or all of the stored cryptographic key information. The authority could be any suitable trusted authority. Messages from the authority are signed/verified using HMAC (hash based message authentication code). Thus in some embodiments, there is a trusted authority which may for example generate HMAC signed messages.

Sets of rules engines and their controllers may be identified before or after customer deployment and bound to one another. This may via a process to physically identify the sets of communicating entities.

In some embodiments, the serial numbers of a set of NICs can be harvested in situ or through customer support databases. The controllers may be assumed to operate within a trusted environment and are identifiable. The rules engines may be assumed to be tamper resistant but operating in a hostile environment. This hostile environment may include manipulation of harvested serial numbers, the insertion of malicious rules engines which attempt to subvert controllers, and the insertion of malicious controllers which attempt to subvert rules engines.

Once bound, each controller and rules engine pair know each other's public key and their own private key and can therefore communicate via standard asymmetric cryptography (e.g. RSA-2048) a new random shared key and establish a unique encrypted revocable communication channel (control plane). Communication over the control plane may use AES-256 (advanced encryption standard) or the like symmetric cypher. It may be that a given controller will need to use a set of cyphers to match that supported by the rules engine.

Alternatively, once bound, each controller-rules engine pair may communicate a shared key to establish a unique authenticated revocable communication channel using HMAC authentication.

The controller may periodically re-establish the control plane with subsequent communication taking place using a new shared key This may take place relatively frequently in some embodiments.

The binding process may be repeated to enable the sets of controllers and rules engines to be changed. This is to enable deployment changes and/or revocation of controllers and rules engines.

The control plane messages may be carried using a network protocol appropriate for the hardware on which the Rules Engine is implemented. For example the protocol may be UDP—user datagram protocol.

The control plane may employ heartbeats, retransmission and congestion avoidance mechanisms The following describes a public key infrastructure to implement control plane establishment. However, it should be appreciated that any other method may be used to provide a secure control plane for communications between the controller and respective rules engine.

A unique public/private key pair may be one time generated at manufacture or at a trusted location and stored within the rules engine in a tamper resistant manner.

The public key for each rules engine instance is stored in a trusted repository. The keys may be for use with the RSA-2048 algorithm or the like. The repository may be indexed by device serial numbers (which can be harvested from deployed devices).

In some embodiments, the rules engine is not required to release any key. The repository may not be required to store the rules engine private keys.

The private key should be stored securely as each rules engine (NIC) allows. This may be by means of nonvolatile memory in the rule engine.

A unique public/private key pair may be one time generated at manufacture or at a trusted location and stored within the Controller in a tamper resistant manner. The public key for each controller may be stored in a trusted repository (which may be the same or different to that used by the rules engines). The keys may be used with the RSA-2048 algorithm or the like.

The controller private key may be kept securely and may never transmitted outside of the controller. Preferably the controller contains a HSM.

The repository is not required to store the Controller private keys but may do so in some embodiments.

The repository is designed to prevent the insertion or tampering with the public keys to reduce the likely hood of man in the middle attack. The keys themselves are not secret, they are public. However is desirable to avoid a man in the middle attack where a malicious public key is injected into the repository.

Each Controller may receive the public keys of the rules engines to which it is bound from the trusted repository. Each rules engine may receive the public keys of the one or more controllers to which it is bound from the trusted repository Each rules engine may receive a message from the controller and encrypted by the rule engine's public key and (signed with) the controller's private key. The message will contain a symmetric encryption/decryption key to use for subsequent secure communication between the rules engine and the controller.

This message could be broadcast, for example over a Layer 2 network. Alternatively, the controller may have received the IP address of each rules engine when it got the public keys. The rules engine authenticates the message (using the known controller public key) and decrypts using its own private key. The rules engine and Controller will use the resulting encryption key for subsequent communication.

Thus in some embodiments, a secure key exchange between the controller and the rules engine may be provided and a binding between the pair may be established. The above steps can be repeated to change the public/private keys according to policy. For example policy could allow reprogramming of the keys where the update messages are signed by an authority, to allow devices to generate new keys (reporting only the public key), or to enforce one time only programming of keys into devices (requiring a device to be recycled if a key is revoked).

In some embodiments, a controller will be able to control more than one rules engines. The rules engines maybe optimized for different functions.

In some embodiments, apparatus may be provided which has rules engine and a NIC function. The apparatus may comprise at least one processor and at least one memory. The rules engine may be part of the NIC function or separate. The keys may be stored in the NIC. The apparatus may be a network adaptor.

In other embodiments, the rules engine may be provided by a firewall.

In other embodiments, the rules engine may be provided by a switch.

In other embodiments, the rules engine may be provided in a hypervisor.

The controller may be provided by software running on the server. The server will comprise at least one processor and at least one memory The controller may be provided in a trusted domain.

A computer program may be stored in at least one memory and when run on a processor may be configured to provide the rules engine.

A computer program may be stored in at least one memory and when run on a processor may be configured to provide the controller.

In some embodiments, the data flows passing through the rules engine may be encrypted for example SSL. The rules engine may perform protocol (for example TCP-transmission control protocol) reassembly and decrypt the flows before applying rules. The rules here could be regular expressions over any of the data payload, and could result in all or some of the decrypted payload being reported over the control plane. Optionally the rules engine may re-encrypt the data before passing to the host so that the operation is entirely transparent (a man-in the middle SSL bridge).

This may for example be applied in a rules engine provided in a NIC.

These reports which are generated by every controller can be combined in order to form a connectivity graph for all the servers in the data-center. This provides information on which applications and services are communicating, not just which servers are communicating. The information can be used to validate or prune a pre-existing access control rule set or generate a rule set. This feature may be used for securing large flat networks.

Figure 7:
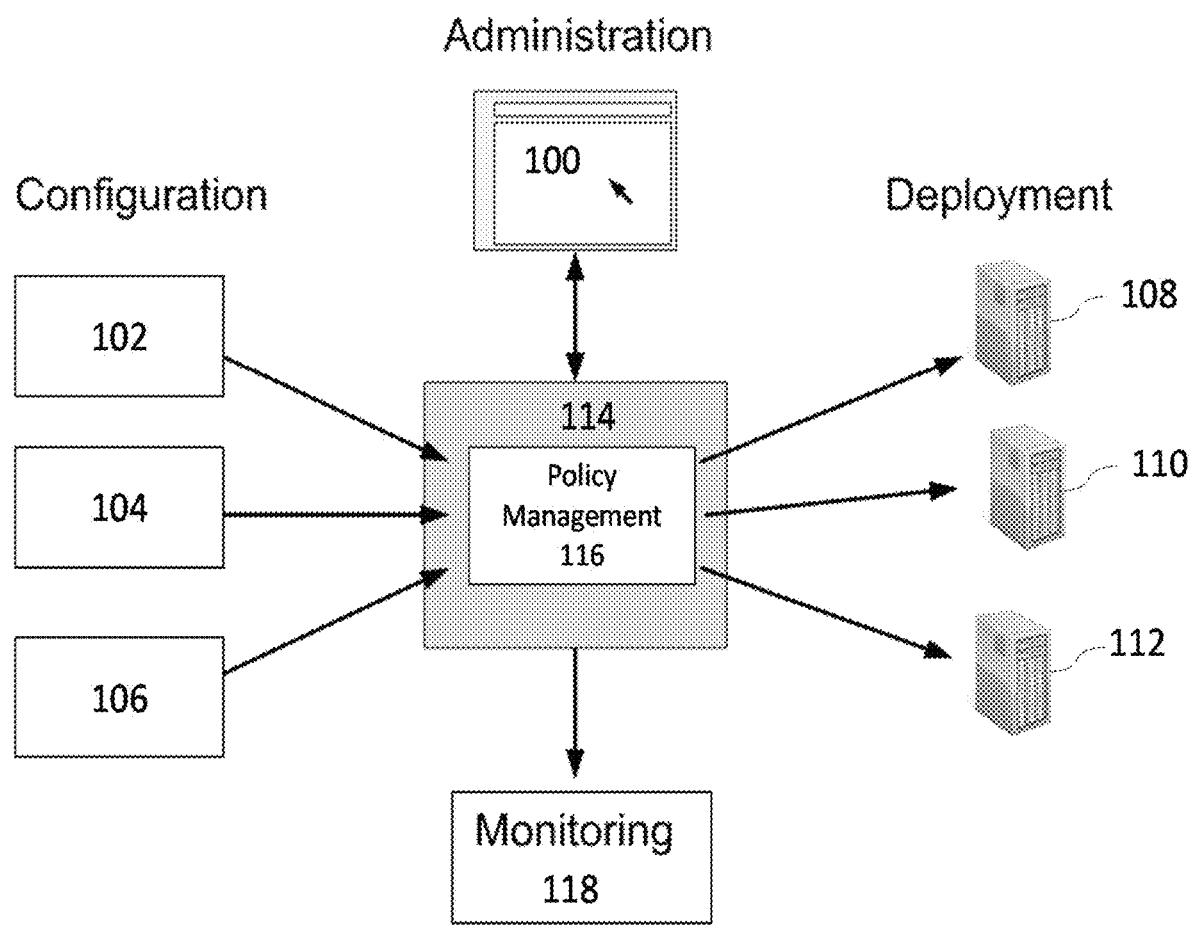
FIG. 7 shows an overview of a system in which embodiments may be provided.
Figure 8:
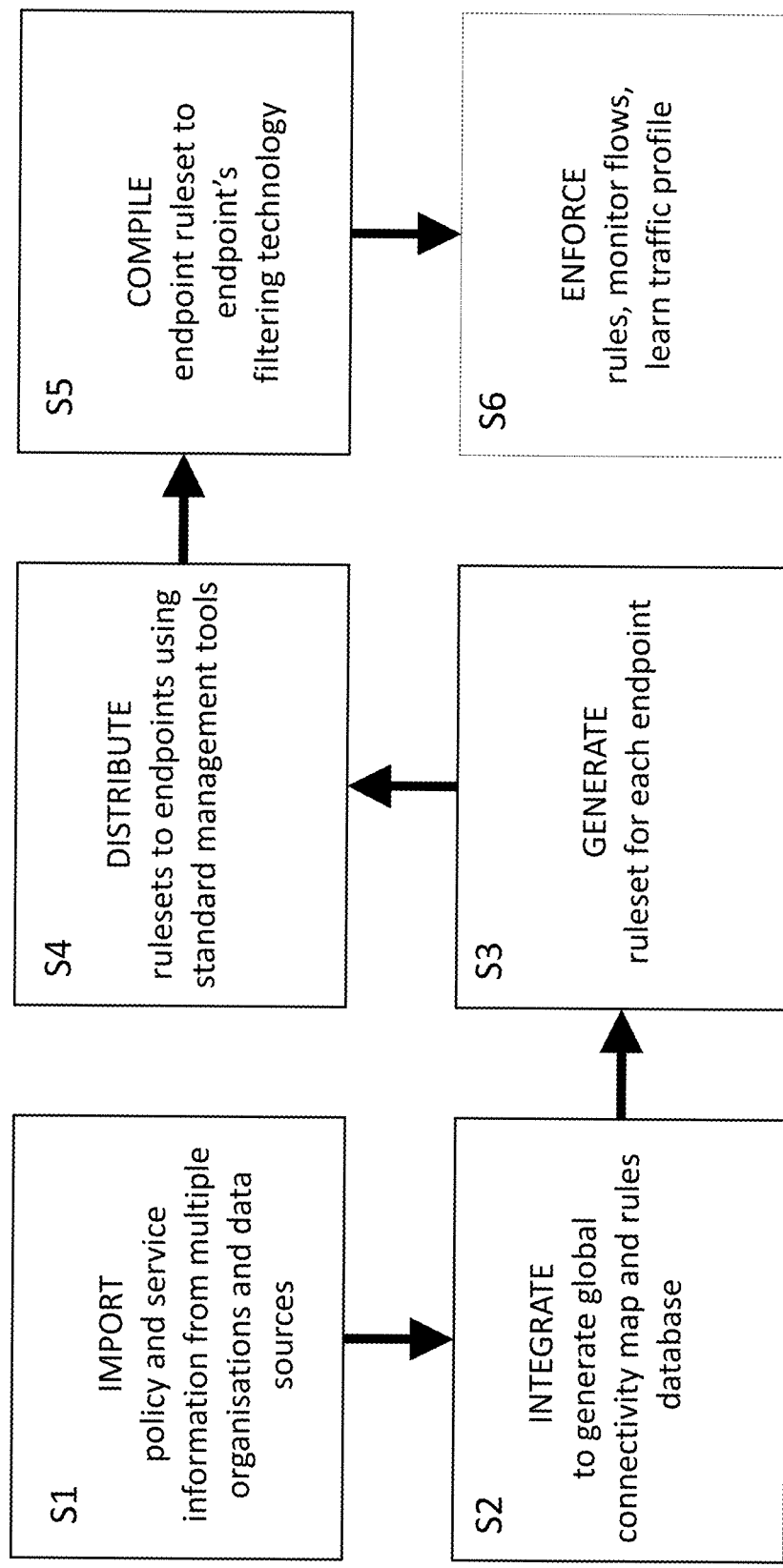
FIG. 8 shows a tool which can be used to manage security policy in some embodiments.

Reference is made to FIGS. 7 and 8. FIG. 8 schematically shows a tool which can be used to manage security policy based on service level information and monitored flows. The tool is schematically shown as a work flow. FIG. 7 shows the system architecture with which the tool can be used.

In a first step S1 of the work flow, policy and server information may be imported from a plurality of data sources. The data sources may be in the same organization and/or different organizations. The data source may provide information collected by a controller from one or more rules engines and/or firewall information. In FIG. 7, these data sources are references 102, 104 and 106. For example, each data source may be from a different business unit. Each of these data sources may administer and input its own configuration for deployment. However the policy management function 116 will be able to provide and enforce overriding policies or rules.

In the second step S2 of the workflow, the imported policy and server information is integrated to generate a global connectivity map and a rules database. This may be represented by the policy management function 116 of the function 114.

In the third step S3 of the workflow, a ruleset is generated for each endpoint. The endpoints are represented schematically by 108, 110 and 112. Each of these endpoints may each have one or more rules engines.

In the fourth step S4, the rule sets are distributed to the endpoints. This may be using management tools.

In the fifth step S5, at the endpoints, there may be compiling of the endpoint's ruleset in accordance with the filtering technology used at that endpoint.

In the sixth step S6, the endpoints will enforce the rules, monitor flows and learn traffic profiles. This is done by the rules engines as discussed previously.

The policy function 116 may define services, which may be complex, the roles of infrastructure and their access to services. For example, it can be defined which entities are able to communicate with which other entity. An entity may be a server, a domain, part of a server, part of a domain, user device or any other suitable entity.

In embodiments, the rules engines will parse the data flows in the network and accordingly, information (reports) to the network can be used to provide a connectivity graph showing specific flows. In some embodiments, the data provided can be used to create a higher level connectivity graph showing which application is connected to which other application. These higher level graphs can be used to detect unusual network patterns, possible resulting from malicious activity and/or can be used to assist in network planning for managing traffic flows.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system comprising:
   a first rule engine provided;
   a second rule engine provided in a network interface device,
   wherein the first and second rule engines are configured to:
      receive data flows, said data flows being between the network and an application; and
      determine data flow information of said data flows and, in dependence on said data flow information, perform actions with respect to said data flows; and
   a plurality of controllers, each of said controllers being configured to: provide, via secure communications, control information to the first and second rule engines to define one or more actions performable with respect to said data flows,
   wherein the first and second rule engines are configured to:
      provide, via secure communications, state information relating to at least some of the received data flows to one or more of the plurality of controllers,
   wherein one or more of the plurality of controllers are configured to share the state information received with others of the plurality of controllers, wherein the one or more of the plurality of controllers are configured to use different keys to communicate with different ones of the others of the plurality of controllers,
   wherein each of said controllers receives, from a trusted repository, a list of public keys for communicating with at least one of the first and second rule engines, wherein the first and second rule engines are configured to receive, from the trusted repository, public keys for communicating with one of the plurality of controllers,
   wherein said first and second rule engines comprise hardware, one or more programmable hardware processors, or a combination of both,
   wherein said plurality of controllers each comprise hardware, one or more programmable hardware processors, or a combination of both.

2. A system as claimed in claim 1, wherein different rules engines use different keys to communicate with the same one of the controllers.

3. A system as claimed in claim 1, wherein the list of public keys includes a digital signature, wherein each of the controllers is programmed securely with a key of the list of public keys required to verify this digital signature.

4. A system as claimed in claim 1, wherein communication between each of the plurality of controllers is secure.

5. A system as claimed in claim 1, wherein the state information relating to at least some of the received data flows comprises a flow counter for each of at least one of the received data flows.

6. A system as claimed in claim 1, wherein the state information relating to at least some of the received data flows comprises delivery information for at least one of the received data flows.

7. A system as claimed in claim 1, wherein the at least one of the first and second rule engines is configured to:
   store in at least one data store of the at least one of the first and second rule engines, the state information; and
   update the state information held in the at least one data store for at least some of the received data flows.

8. A system as claimed in claim 7, wherein the updating the state information comprises incrementing a flow counter for the at least one of the received data flows.

9. A system as claimed in claim 7, wherein the updating the state information comprises inserting information about a new flow.

10. A system as claimed in claim 1, wherein sharing of state information enables failover from one of the controllers to another of the controllers.

11. A system as claimed in claim 1, wherein the at least one of the first and second rule engines is configured to:
    parse frames of the received data flows;
    determine a match of one or more frames of one of the received data flows to data flow information stored in a data store of the at least one of the first and second rule engines; and
    in response to the determined match, perform one of said actions with respect to said one of the received data flows.

12. A system as claimed in claim 1, wherein said data flow information comprises header information.

13. A system as claimed in claim 1, wherein the one or more of the plurality of controllers are configured to periodically query the at least one of the first and second rule engines for updates to the state information.

14. A server apparatus comprising:
    a controller configured to provide, via secure communications, control information to a first rule engine, and a second rule engine in a network interface device to define one or more actions performable with respect to data flows received at the first and second rule engines, the first and second rule engines being configured to receive the data flows between a network and an application and to perform the one or more actions with respect to the data flows,
    wherein said controller is configured to:
       receive, via secure communications, state information from at least of the first and second rule engines; and
       share the received state information with one or more others of a plurality of controllers,
    wherein said controller receives, from a trusted repository, a list of public keys for communicating with at least one of the first and second rule engines, wherein the first and second rule engines are configured to receive, from the trusted repository, public keys for communicating with one of the plurality of controllers,
    wherein the controller is configured to use different keys to communicate with different ones of the plurality of controllers,
    wherein the state information relates to at least some of the data flows received,
    wherein said controller comprises hardware, one or more programmable hardware processors, or a combination of both.

15. A system comprising:
    a first rule engine provided;
    a second rule engine provided in a network interface device,
    wherein the first and second rule engines are configured to:
       receive data flows, said data flows being between the network and an application; and determine data flow information of said data flows and, in dependence on said data flow information, perform actions with respect to said data flows; and
a plurality of controllers, each of said controllers being configured to: provide, via secure communications, control information to the first and second rule engines to define one or more actions performable with respect to said data flows,
wherein the first and second rule engines are configured to:
provide, via secure communications, state information relating to at least some of the received data flows to one or more of the plurality of controllers,
wherein one or more of the plurality of controllers are configured to share the state information received with others of the plurality of controllers, wherein the one or more of the plurality of controllers are configured to use different keys to communicate with different ones of the others of the plurality of controllers,
wherein each of said controllers receives a list of public keys including a digital signature for communicating with at least one of the first and second rule engines, wherein each of said controllers is programmed securely with a key from the list of public keys required to verify the digital signature,
wherein said first and second rule engines comprise hardware, one or more programmable hardware processors, or a combination of both,
wherein said plurality of controllers each comprise hardware, one or more programmable hardware processors, or a combination of both.

* * * * *

UNITED STATES PATENT AND TRADEMARK OFFICE
CERTIFICATE OF CORRECTION

PATENT NO. : 11,489,876 B2
APPLICATION NO. : 16/815881
DATED : November 1, 2022
INVENTOR(S) : Steven L. Pope, David J. Riddoch and Derek Roberts It is certified that error appears in the above-identified patent and that said Letters Patent is hereby corrected as shown below:

In the Claims

In Claim 1, Column 15, Line 11, after "provided" insert -- in a hypervisor --.

In Claim 14, Column 16, Line 33, after "engine" insert -- in a hypervisor --.

In Claim 15, Column 16, Line 60, after "provided" insert -- in a hypervisor --.

Signed and Sealed this
Tenth Day of September, 2024

Katherine Kelly Vidal
*Director of the United States Patent and Trademark Office*